(12) United States Patent
Grasis et al.

(10) Patent No.: US 6,198,857 B1
(45) Date of Patent: Mar. 6, 2001

(54) ADD/DROP OPTICAL MULTIPLEXING DEVICE

(75) Inventors: Michael E. Grasis, Brookfield; Michael A. Scobey, Marlborough; Derek E. Spock, Watertown; Robert W. Lafreniere, Tewksbury, all of MA (US)

(73) Assignee: Corning OCA Corporation, Marlborough, MA (US)

( * ) Notice: Subject to any disclaimer, the term of this patent is extended or adjusted under 35 U.S.C. 154(b) by 0 days.

(21) Appl. No.: 09/222,626

(22) Filed: Dec. 29, 1998

Related U.S. Application Data (60) Provisional application No. 60/070,490, filed on Jan. 5, 1998.

(51) Int. Cl.$^7$ ................................................ G02B 6/28
(52) U.S. Cl. ............................... 385/24; 385/47; 385/34
(58) Field of Search ................................. 385/24, 47, 31, 385/33, 46, 34

(56) References Cited

U.S. PATENT DOCUMENTS

| | | | |
|---|---|---|---|
| 4,693,544 | * 9/1987 | Yamasaki et al. | 350/96.16 |
| 4,768,849 | 9/1988 | Hicks, Jr. | 350/96.15 |
| 4,805,977 | * 2/1989 | Tamura et al. | 350/96.16 |
| 4,824,200 | * 4/1989 | Isono et al. | 350/96.16 |
| 5,933,260 | 8/1999 | Cao et al. | |

* cited by examiner

Primary Examiner—Hung N. Ngo
(74) Attorney, Agent, or Firm—Philip G. Alden (57) ABSTRACT

An optical multiplexing device is disclosed for multiplexing optical signals, for example, for a fiber-optic telecommunication system employing wavelength division multiplexing. The optical multiplexing device has a filter assembly defining a light path, preferably a multi-bounce zigzag expanded beam light path, from a common port at least to a first channel port and then a second channel port and then a pass-through port. The first channel port has a first optical filter element, for example, a multi-cavity interference filter, which is transparent to a wavelength sub-range within the wavelength range passed by the common port and the pass-through port, and substantially reflective of other wavelengths within such wavelength range. The second channel port includes a second optical filter element having light transmittance and reflectance properties substantially the same as those of the first optical filter element. The optical multiplexing device can be used to extract or drop a selected wavelength sub-range, most typically a single channel signal, from the multiplexed light, and to then inject a new signal into the multiplexed light at that same wavelength sub-range. In accordance with preferred embodiments, the optical multiplexing device serves as an add/drop filter arrangement to extract the signal of a particular channel and then immediately use the available channel by injecting a new signal at that same wavelength sub-range.

22 Claims, 7 Drawing Sheets

ADD/DROP OPTICAL MULTIPLEXING DEVICE

This application claims benefit of Provisional appln. 60/070,490 filed Jan. 5, 1998.

The present invention is directed to an optical multiplexing device. More particularly, the invention is directed to an optical multiplexing device suitable for removing a single channel or other selected wavelength sub-range from the multiplexed signal of a system employing wavelength division multiplexing, and to re-inject a new signal at the same channel or within the same wavelength sub-range.

BACKGROUND

Wavelength division multiplexing of optical signals is finding widespread use in various fields, including especially for data transmission and other telecommunication applications. The use of wavelength division multiplexing in fiber-optic systems has gained interest as a feasible method of increasing data transfer capacity of a fiber-optic line and/or other waveguide. In particular, wavelength division multiplexing can increase capacity of a fiber-optic trunk line at substantially lower cost than the laying of additional new fiber-optic lines. Wavelength division multiplexing allows multiple signals at different wavelengths to be carried simultaneously by a fiber-optic line or other waveguide.

The increase in carrying capacity of a fiber-optic line can be approximately linearly proportional to the number of multiplexed channels. That is, for example, a fiber-optic system employing 16 channel wavelength division multiplexing has approximately sixteen times the carrying capacity or throughput at a given bit transfer rate as the same system not employing wavelength division multiplexing. Presently preferred wavelength bands for fiber-optic transmission media include those centered at 1.3 m and 1.55 m. The latter is especially preferred because of its minimal absorption and the commercial availability of erbium doped fiber amplifiers. The useful bandwidth is approximately 10 to 40 nm, depending on application. Wavelength division multiplexing can separate this bandwidth into multiple channels. Ideally, the 1.55 m wavelength band, for example, would be divided into multiple discreet channels, such as 4, 8, 16 or even as many as 32 or more channels, through a technique referred to as dense channel wavelength division multiplexing, as a low cost method of substantially increasing a waveguide's signal carrying capacity, such as long-haul telecommunication capacity over existing fiber-optic transmission lines. The International Telephony Union (ITU) Grid provides standard center wavelengths for channels in the 1.55 m wavelength band, at 100 Ghz spacing (approximately 0.8 nm). Wavelength division multiplexing may be used to supply telephony and data transmission and, more and more in the future, such services as video-on-demand and other existing or planned multimedia, interactive services. Techniques and devices are required, however, for multiplexing the different discreet carrier wavelengths. That is, the individual optic signals must be combined onto a common fiber-optical waveguide and then later separated again into the individual signals or channels at the opposite end of the fiber-optic cable. Thus, the ability to effectively combine and then separate individual channels (or wavelength bands) on a fiber-optic trunk line or other optical signal source is of growing importance to fiber-optic telecommunications and other fields.

Known devices for this purpose have employed, for example, diffraction gratings, prisms and various types of fixed or tunable filters. Gratings and prisms typically require complicated and bulky alignment systems and have been found to provide poor efficiency and poor stability under changing ambient conditions. Fixed wavelength filters, such as interference coatings, can be made substantially more stable. In this regard, quality interference coatings of metal oxide materials, such as niobia and silica, can be produced by commercially known plasma deposition techniques, such as ion assisted electron beam evaporation, ion beam sputtering, and reactive magnetron sputtering, e.g., as disclosed in U.S. Pat. No. 4,851,095 to Scobey et al and U.S. Pat. No. 5,525,199 to Scobey. Such coating methods can produce interference cavity filters formed of stacked dielectric optical coatings which are advantageously dense and stable, with low film scatter and low absorption, as well as low sensitivity to temperature changes and ambient humidity.

Optical multiplexing devices are known for combining the multiple channel signals at one end of a trunk line and for separating out the individual signals at the opposite end of the trunk line. That is, multiplexing here refers to adding channels, removing channels or both. For simplicity of explanation, only the demultiplexing functionality is described here in detail, since those skilled in the art will readily understand the correlative multiplexing functionality. That is, those skilled in the art will recognize how the same device can be employed in reverse. The term "multiplexing" will be used here to refer to both the combining and separating of channels. The term "trunk line" is used here to refer to any fiber-optic or other waveguide carrying a multi-channel optical signal, that is, a signal comprising multiple wavelength sub-ranges multiplexed together on the trunk line. It is known to optically couple a trunk line carrying multiple channels to a common port of a wavelength division multiplexer ("WDM"—this term is used here to mean devices which combine signals, separate signals or both). Such WDM common port is, in turn, optically coupled within the WDM to multiple channel ports. Associated with each channel port is an interference filter or the like which is substantially transparent to the wavelength band of that particular channel. Thus, signals having the wavelength assigned to a particular channel are passed by the WDM through its respective channel port to and/or from the individual waveguide for that channel.

Interference filters of the Fabry-Perot type, which are preferred in various multiplexing applications, typically transmit only a single wavelength or range of wavelengths. Multiple filter units can be used together in a WDM, e.g., on a common parallelogram prism or other optical block. Multiple optical filters are joined together, for example, in the multiplexing device of U.K. patent application GB 2,014,752A to separate light of different wavelengths transmitted down a common optical waveguide. At least two transmission filters, each of which transmits light of a different predetermined wavelength and reflects light of other wavelengths, are attached adjacent each other to a transparent substrate. The optical filters are arranged so that an optical beam is partially transmitted and partially reflected by each optical filter in turn, producing a zigzag light path. Light of a particular wavelength is subtracted or added at each filter. Similarly, in the multiplexing device of European patent application No. 85102054.5 to Oki Electric Industry Co., Ltd., a so-called hybrid optical wavelength division multiplexer-demultiplexer is suggested, wherein multiple separate interference filters of different transmissivities are applied to the side surfaces of a glass block. A somewhat related approach is suggested in U.S. Pat. No.

5,005,935 to Kunikani et al, wherein a wavelength division multiplexing optical transmission system for use in bi-directional optical fiber communications between a central telephone exchange and a remote subscriber employs multiple separately located multiplexers each having separate filter elements applied to various surfaces of a parallelogram prism.

Figure 1:
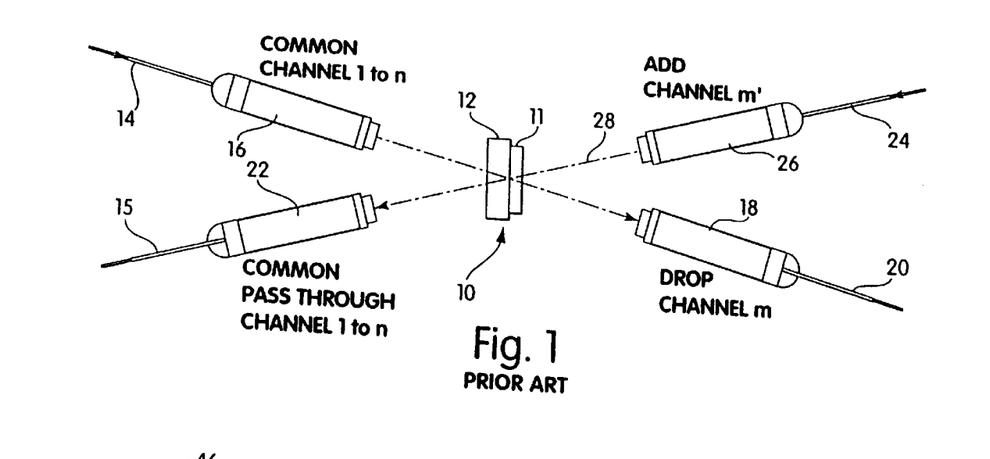
FIG. 1 illustrates a prior known add/drop filter device discussed in the Background section above.

In addition to multiplexing signals at opposite ends of a trunk line, systems employing wavelength division multiplexing have been evolving more complicated architectures, employing, for example, add/drop optical multiplexing devices for removing and/or injecting a single channel at any point along a trunk line. Filter devices for multiplexing a single wavelength subrange, and the use of a series of such devices for multiplexing multiple wavelength subranges in sequence, are shown for example, in U.S. Pat. No. 4,768,849 to Hicks, Jr. In that patent multiple filter taps, each employing dielectric filter mirrors and lenses for removing (or adding) one channel from a multi-channel trunk line, are shown in use singly and in arrays for removing a series of channels. It has been suggested to use a single narrowband cavity filter as an add/drop optical multiplexing device. As shown in FIG. 1, a previously known add/drop optical multiplexing device employs a filter element 10 comprising a narrowband cavity filter 11 carried on a suitable optical substrate 12. The signal from a trunk line 14 carrying multiplexed channels 1-n is passed through a collimator 16 to the filter element 10. The signal corresponding to channel m is in-band of narrowband cavity filter 11 and, accordingly, passes through filter element 10 to collimator 18.

Thus, the device serves to drop channel m from the multiplexed signal. Collimator 18 is optically coupled to branch line 20, comprising a fiber-optic or other waveguide. Alternatively, channel m can be passed from filter element 10 to an optical detector or other destination. The remainder of channels 1 through n are not in-band of cavity filter 11 and, accordingly, are reflected by cavity filter 11 to collimator 22 of a common pass through which is optically coupled to a downstream portion 15 of trunk line 14. A branch feed line 24 optically coupled to collimator 26, or other optical signal source, serves to add channel m' to the multiplexed signal. It passes an optical signal 28 for channel m' to filter element 10. Channel m' employs the same wavelength sub-range as channel m, but has a different "payload" or information. The downstream portion 15 of the trunk line 14 thus carries a multiplexed signal comprising channels I through n, which includes a signal m' in the wavelength sub-range made available by dropped channel m.

Figure 2:
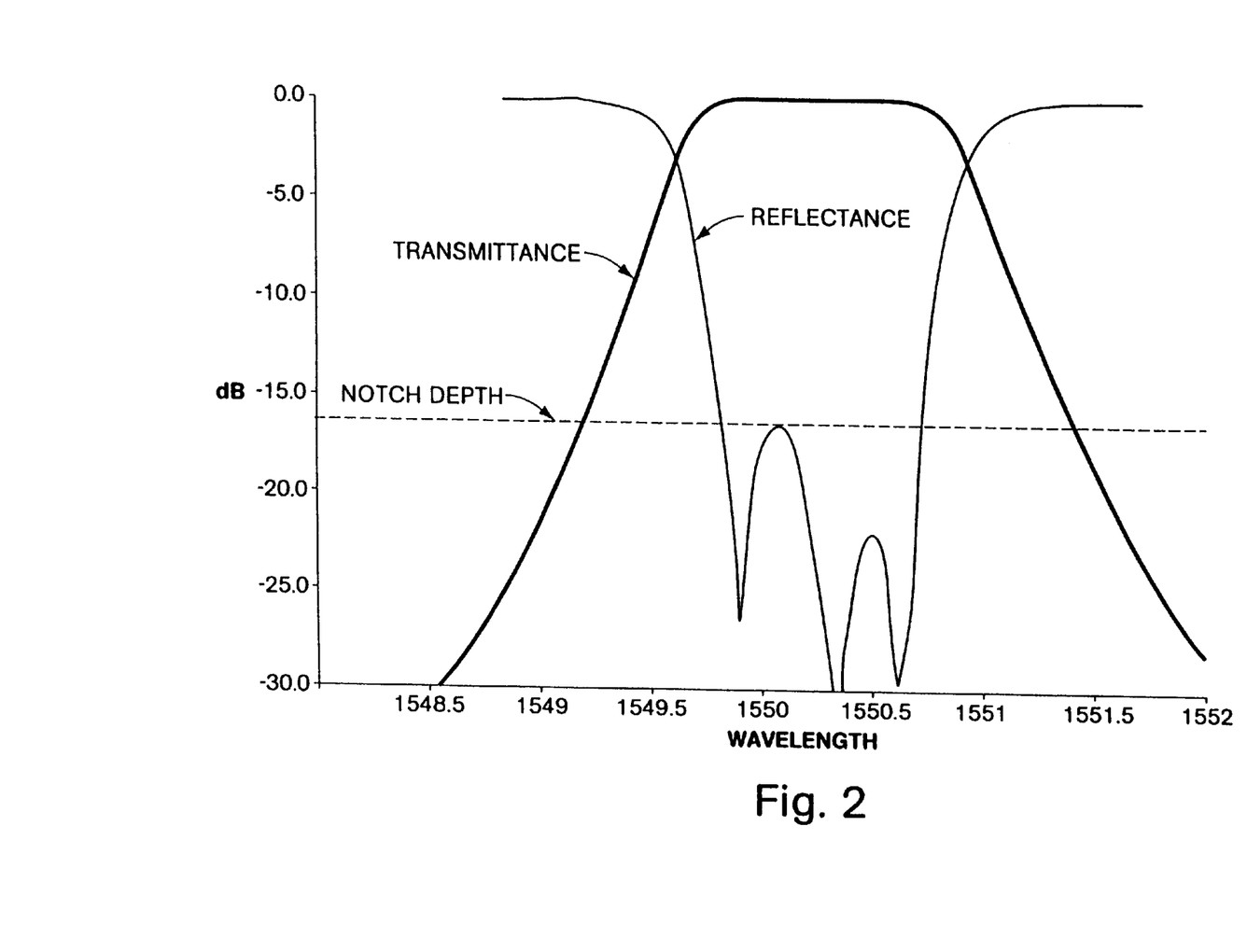
FIG. 2 is a graph showing the reflectance and transmittance for a typical 3 cavity interference filter on a glass substrate in air, using a 6° angle of incidence, with the notch depth indicated.

A problem encountered in the use of previously known devices of the type shown in FIG. 1, is that a residual portion of the signal of channel m reflects from filter 11 and is reimaged into collimator 22. This light then introduces crosstalk to channel m', which is by definition the same wavelength as the residual reflection. A typical filter will reflect between 2.5% to 10% (−16 to −10 dB) of the light, as shown in the graph of FIG. 2. As shown there, the depth of the notch function of an interference filter (measured at the worst performance point, that is, the highest reflectance point across the in-band range) is limited in general to −16 dB over the in-band region.

In contrast, current specifications for a typical fiber-optic telecommunication system may call for a channel drop efficiency of at least −30 dB to −40 dB (corresponding to residual reflection of no more than 0.1% to 0.01%). It is not commercially practicable to produce a −30 dB or −40 dB filter element employing a single filter as in the devices described above, using currently available materials and manufacturing techniques for narrowband cavity filters, especially for tight channel spacings such as 200 Ghz or even 100 Ghz, as are presently proposed for fiber-optic telecommunication systems. For filters used in transmission, better isolation can be achieved by using a filter with a higher number of cavities. However, as the number of cavities increases and the complexity of the coating increases, typically, the notch depth (see FIG. 2) becomes less (that is, there is greater in-band reflectance) due to increased residual reflection. That is, the greater the number of cavities, the steeper the slopes and the higher the figure of merit in transmission, but typically the residual reflection of the in-band region increase, which reduces the isolation of the add/drop multiplexing device. The figure of merit ("FOM") as used here, unless another meaning is clear from the context, means the ratio of the width of the in-band reflectance curve at −30 dB to the width of the in-band reflectance curve at −1 dB ("FOM 30/1)", or at −0.5 dB ("FOM 30/0.5") or at −0.25 dB ("FOM 30/0.25"). A higher FOM is advantageous, as it corresponds to lower reflectance to the pass-through port of the signal extracted at the drop channel port of the add/drop multiplexing device.

It is an object of the present invention to provide an add/drop optical multiplexing device which provides excellent signal isolation employing filter elements which can be produced using currently commercially available manufacturing materials and techniques. It is an object of at least preferred embodiments of the invention to provide a fiber-optic telecommunication system employing one or more such add/drop optical multiplexing devices. Additional objects and advantages of the invention will become apparent from the following disclosure of the invention, including detailed description of certain preferred embodiments.

SUMMARY

In accordance with a first aspect, an add/drop optical multiplexing device comprises a filter assembly defining a light path from a common port to a first channel port and then to a second channel port and then to a pass-through port. The common port and the pass-through port each is substantially transparent to at least a wavelength range, for example, to the entire wavelength range carried by a fiber-optic system trunk line optically coupled to the device. Optionally, each is unfiltered so as to be wavelength non-selective. In accordance with preferred embodiments involving a fiber-optic telecommunication system carrying a multi-channel signal on fiber-optic lines and/or other waveguides, the common port and pass-through port preferably are transparent to a wavelength range including the different wavelength sub-ranges assigned to each of the channels carried by the system. Typically, a fiber-optic trunk line will be optically coupled to a collimator or the like, for passing an expanded beam into the optical block through the common port. The multiplexed light follows a light path to the pass-through port, typically a multi-bounce light path entirely within the device with a bounce point at the first and second channel ports. The first channel port comprises a first optical filter element substantially transparent to a wavelength sub-range within the wavelength range of the common port, and substantially reflective of other wavelengths within the wavelength range. In certain preferred embodiments involving a multi-channel fiber-optic telecommunication system, the first channel port typically will pass a wavelength sub-range assigned to a single channel of the system. In certain preferred embodiments channel port(s) of the add/drop optical multiplexing device comprise, in addition to the filter element and any optional post-filter element, a light detector (which may be part of a light detector array), a collimator aligned with the port, and/or other device for receiving light passed by the filter element of the port and/or for passing light to the filter element of the port. Preferably, the first optical filter element comprises a narrowband cavity filter as further described below. The second channel port of the add/drop optical multiplexing device also comprises an optical filter element, having light transmittance and reflectance properties substantially identical to those of the first optical filter element. It will be understood by those skilled in the art that reference here to a wavelength sub-range assigned to a particular channel will mean generally the wavelength range having a channel width and center wavelength specified for the fiber-optic telecommunication system or other system employing the device. In that regard, it will be recognized also that narrowband filter elements, even high quality multi-cavity filter elements, have low but non-zero transmittance of wavelengths outside a desired sub-range. Similarly, such filters will have low but non-zero reflectance of wavelengths within the desired sub-range. Significantly, the optical filter element of the second channel port has light transmittance and reflectance properties substantially identical to those of the first optical filter element.

The filter assembly of the optical multiplexing devices disclosed here may employ filter and, optionally, reflective elements mounted to a single optical block or otherwise fixtured together, preferably within a common housing. Alternatively, the filter assembly may comprise multiple units with suitable means, e.g., fiber-optic lines, etc., for optically coupling one filter element (or reflective element) to the next.

Significant advantages are achieved by the add/drop optical multiplexing device disclosed here. The information carried on a selected channel of a multi-channel system employing wavelength division multiplexing can be extracted by the add/drop optical multiplexing device. A new signal at the same wavelength sub-range can then be injected into the multiplexed multi-channel signal by the same device. Moreover, excellent signal isolation can be achieved. Employing a typical, commercially available −10 dB filter, for example, approximately 10% of the original signal on the channel extracted at the first channel port would be reflected by the filter. Rather than such 10% of the original payload remaining in the multiplexed signal, however, it is further reduced at the second channel port of the device. Specifically, if the filter at the second channel port is also a −10 dB filter, then the original payload will be further reduced at the second channel port, resulting in the equivalent of a −20 dB filter element. Employing −15 dB filter elements at the first and second channel ports would correspondingly produce a −30 dB device. Thus, advantageously high signal isolation is achieved in a device capable of substituting one channel signal with a new channel signal at the same wavelength sub-range. A high "effective FOM" is achieved using multiple, substantially identical filters which individually would provide a lower FOM. Comparable performance could not be achieved by prior known devices employing a single filter element for a particular in-band transmittance. A single −20 dB filter would be more costly than two −10 dB filters, and at this time, commercially suitable available filters have not reached the quality of −30 dB signal isolation. Moreover, total signal loss is surprisingly low; the multi-channel signal is imaged into a collimator only once per pass. This is significant, since −30 dB signal isolation is currently being specified for advanced fiber-optic telecommunication systems, but cannot be achieved by commercially suitable, single filters.

Additional features and advantages of the present invention will be further understood from the following detailed description of certain preferred embodiments.

BRIEF DESCRIPTION OF THE DRAWINGS

The present invention will be further disclosed by the following detailed description of certain preferred embodiments, with reference to the appended drawings.

It should be recognized that the drawings are generally schematic and not necessarily to scale, either in their various dimensions or angular relationships. It will be well within the ability of those skilled in the art to select suitable dimensions and angular relationships for such devices in view of the foregoing disclosure and the following detailed description of preferred embodiments, e.g., band notching applications such as for spectroscopic or other analytical uses.

DETAILED DESCRIPTION OF CERTAIN PREFERRED EMBODIMENTS

As indicated above, the add/drop optical multiplexing devices of the present invention, in accordance with various different embodiments, have various diverse applications. For purposes of exemplifying particular optional or preferred features, the following discussion will generally assume that the add/drop optical multiplexing device is employed in a fiber-optic telecommunication system employing wavelength division multiplexing. It will, however, be within the ability of those skilled in the art, given the benefit of this disclosure and of the following detailed description of various preferred embodiments, to employ suitable embodiments in alternative applications, e.g., band notching applications such as for spectroscopic or other analytical uses.

Figure 3A:
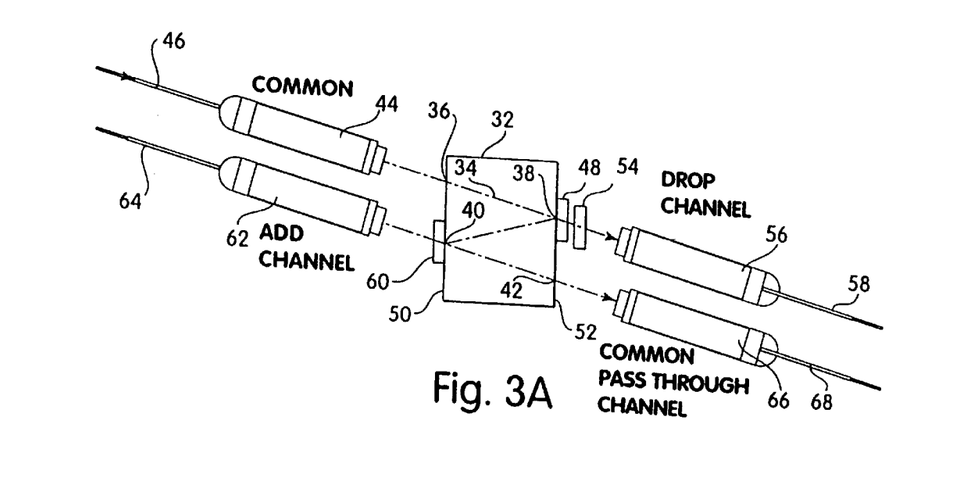
FIG. 3A illustrates an add/drop optical multiplexing device in accordance with one preferred embodiment of the present invention.

A first preferred embodiment of the add/drop optical multiplexing device is illustrated in FIG. 3A. Specifically, the optical multiplexing device 30 is seen to comprise an optical block 32 defining within it a multi-bounce zigzag expanded beam light path 34 from a common port 36 to a first channel port 38, then to a second channel port 40, and then to a pass-through port 42. The common port 36 is seen to comprise a collimator 44 optically coupled to a trunk line 46 of a fiber-optic telecommunication system employing wavelength division multiplexing. Accordingly, collimator 44 passes a multi-channel multiplexed signal through common port 36 along light path 34. At first channel port 38 the light encounters filter element 48. Filter element 48 preferably is a multi-cavity, most preferably 3 to 5 cavity, narrowband interference filter on a suitable optical substrate. It can be seen that common port 36 and second channel port 40 are at a first surface 50 of the optical block 32, with first channel port 38 and pass-through port 32 at opposite surface 52 of the optical block 32. In the preferred embodiment illustrated in FIG. 3A, first channel port 38 further comprises a post filter 54 having optical transmittance and reflectance properties substantially identical to those of primary filter element 48. The signal passed through first channel port 38 is received by collimator 56 which is optically coupled to a branch line 58 comprising a fiber-optic line or other suitable waveguide. Thus, the single channel which is in-band of the filter element(s) 48, 54 at channel port 38 is extracted from the multi-channel expanded beam and passed individually to the branch line 58.

The remaining channels, that is, the wavelengths which are not in-band of first channel port 38, are substantially reflected by filter element 48 to pass further along the multi-bounce zigzag light path 34 to second channel port 40. Filter element 60 at second channel port 40 has substantially the same transmittance and reflectance properties as filter element 48 of first channel port 38. Accordingly, residual reflectance of the in-band wavelength sub-range from first channel port 38 is passed by filter element 60 and, typically, not collected. In this way, signal isolation is substantially improved. Specifically, if filter element 48 and filter element 60 each has a notch depth of −10 dB, then the add/drop device of FIG. 3A has a notch depth of −20 dB, that is, it provides −20 dB signal isolation. If each filter has a notch depth of −15 dB which currently is commercially feasible, then the device has a notch depth of −30 dB meeting the stringent signal isolation specifications of certain high quality fiber-optic telecommunication systems.

Second channel port 40 is seen to further comprise a collimator 62 which is optically coupled to branch feed line 64, carrying a signal on the same channel which was extracted at first channel port 38. Such signal from collimator 62 is passed by channel port 40 since it is in-band of filter element 60. Collimator 62 is so aligned as to pass the signal into the multi-bounce zigzag light path 34. Thus, the channels carried by trunk line 46 which were not in-band of the two channel ports are passed, together with the substitute signal for the add/drop channel, through pass-through port 42 to collimator 66, which is optically coupled to downstream portion 68 of trunk line 46.

It will be recognized by those skilled in the art that add/drop optical multiplexing devices in accordance with the embodiment of FIG. 3A can be employed in the opposite direction, with reversal of the add and drop channel ports. Preferably, a post filter is used at the drop channel. Also, it can be seen that the common port and pass-through port are unfiltered so as to be non-wavelength specific.

Specifications for an add/drop optical multiplexing device in accordance with FIG. 3A, suitable for use in a fiber-optic telecommunication system, are provided in Table 1 below. The specifications are for the device without connectors. The first channel port 38 of FIG. 3A is referred to in Table 1 as the "Drop Channel Port." The second channel port 40 of FIG. 3A is referred to as the "Add Channel Port."

TABLE 1

| General Specifications | |
|---|---|
| Pigtails | 1 meter |
| Wavelength spacing | 100 Ghz ITU Grid |
| Centerwavelength offset (drop chan.) | < ±0.04 nm |
| Temperature sensitivity (4° C. to 50° C.) | <0.03 nm total shift |
| Polarization sensitivity | <0.04 nm |
| Insertion loss Common to Drop Channel Port | <1.5 dB |
| Insertion loss Add Channel Port to Pass-Through | <1.5 dB |
| Insertion loss common to pass-through | <0.7 dB except selected channel |
| Bandwidth | ±0.16 nm |
| Bandwidths | |
| Common to pass-through (0.5 dB notch) | <1.2 nm |
| Drop channel 1 dB bandwidth | >.35 nm |
| Drop channel 30 dB bandwidth | <1.28 nm |
| Crosstalk | |
| Nearest neighbor rejection (common to drop channel port) | >27 dB about ±25 Ghz ITU wavelength |
| Next channel rejection (common to drop channel port) | >40 dB |
| In-band rejection (common to pass-through) | >30 dB |
| Ripple | |
| Common to pass-through | <0.5 dB nearest neighbor |
| Common to pass-through | <0.1 dB all other |
| Common to drop channel port | <.5 dB in-band ripple |
| Add channel port to pass-through | <.5 dB in-band ripple |

In accordance with certain preferred embodiments, the add/drop optical multiplexing device employs an optical block which is substantially rectilinear and forms a gas-filled optical slot between a first surface of the optical block (corresponding, for example, to surface 50 of optical block 32 in FIG. 3A) and an opposite surface which is spaced from and substantially parallel to the first surface (corresponding to surface 52 of optical block 32 in FIG. 3A). In such embodiments the common port is at the first surface and at least one of the channel ports is at the opposite surface. Preferably, the common port and the second channel port are at spaced locations of the first surface, while the first channel port and the pass-through port are at spaced locations of the second surface. The selectively transparent filter elements of the two channel ports (and optionally high reflectance mirror elements) can be mounted to the optical block, such that the multi-bounce zigzag expanded beam light path passes through a vacuum, air or other gas within the optical block. In particular, suitable filter elements can be mounted so as to span the optical slot or to be cantilevered from an optical block substrate, such that the expanded beam light passes only through vacuum, air or other gas along the multi-bounce zigzag light path within the optical block. This avoids the disadvantages associated with "epoxy-in-the-path" or, more specifically, it avoids signal degradation problems which can occur in passing the signal through a film of epoxy or other adhesive interface between a filter element and the adjacent surface of a solid optical block. Additional description of an optical block providing a gas-filled optical slot as described above is provided in U.S. patent application Ser. No. 08/800,963 by Scobey, the entire disclosure of which is hereby incorporated by reference.

Figure 3B:
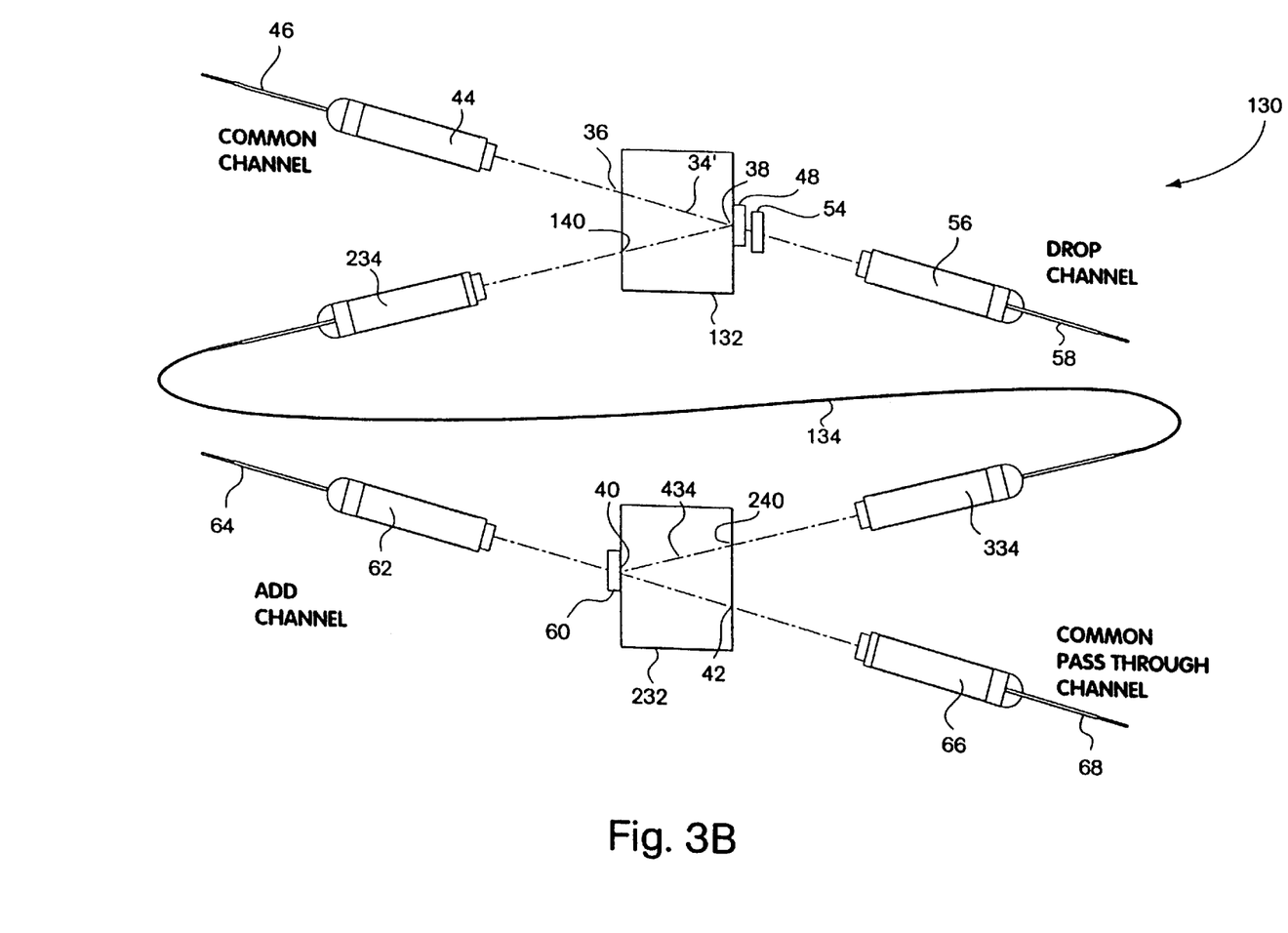
FIG. 3B illustrates a prior known add/drop optical multiplexing device in accordance with another preferred embodiment similar to that of FIG. 3A.

An alternative preferred embodiment of the add/drop optical multiplexing device is illustrated in FIG. 3B. The optical multiplexing device of FIG. 3B is similar to that of FIG. 3A discussed above, and features which are in common to the two alternative embodiments have the same reference numbers in FIGS. 3A and 3B. The optical multiplexing device 130 of FIG. 3B is seen to comprise a first optical block 132 and a second optical block 232 optically coupled to the first optical block 132. A multi-bounce zigzag expanded beam light path 34' extends from common port 36 to first channel port 38, then to output port 140. At output port 140 the expanded beam is focused into fiber-optic waveguide 134 by means of collimator 234. Collimator 334 at the second end of fiber-optic line 134 is optically coupled to input port 240 of optical block 232. Multi-channel light passing into optical block 232 from collimator 334 follows expanded beam light path 434 (as an extension of expanded beam light path 34') to second channel port 40 and then to pass-through port 42. Corresponding substantially to the operating principals discussed above in connection with the embodiment of FIG. 3A, one or more channels of a multi-plexed light signal following light path 34' is extracted at first channel port 38. Specifically, channel port 38 is seen to comprise collimator 56 which focuses light passed by filter element 48 and post-filter element 54 into branch line 58. The remaining channels, that is, the wavelengths which are not in-band of first channel port 38 are substantially reflected by filter element 48 to pass further along the light path 34' to output port 140, which optionally is unfiltered so as to be non-wavelength selective. The light continuing then along light path 434 within second optical block 232 of the multiplexing device 130 are reflected at channel port 40 to pass-through port 42. As described above in connection with the embodiment of FIG. 3A, residual reflectance of in-band wavelengths from first channel port 38 is passed by filter element 60 at second channel port 40, thereby providing improved signal isolation. Collimator 62 of second channel port 40 can be used to pass a replacement channel signal from branch line 64 into the multiplexed light substantially in accordance with the manner described above in connection with the embodiment of FIG. 3A.

Figure 4:
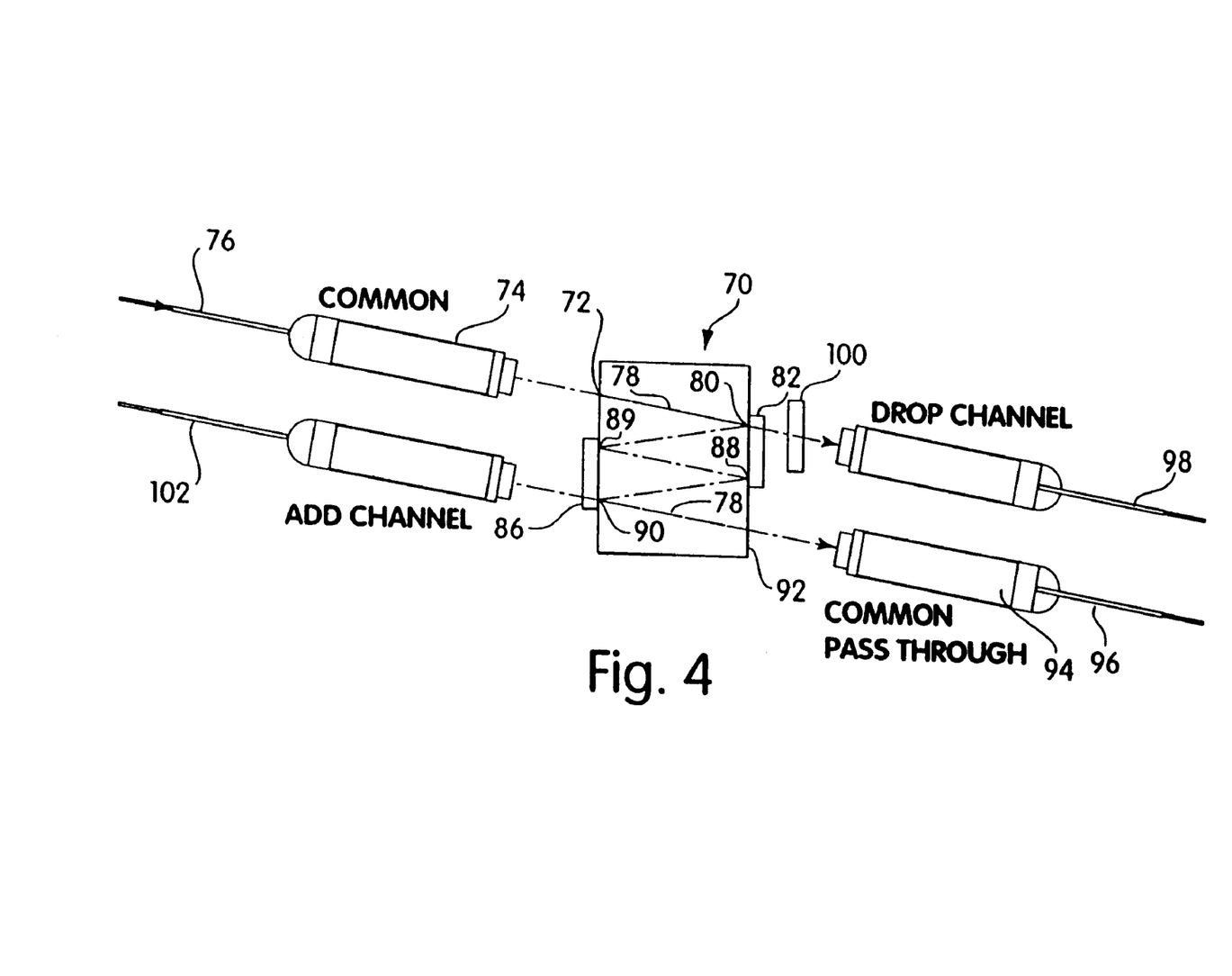
FIG. 4 illustrates an add/drop optical multiplexing device in accordance with another preferred embodiment of the invention.

An alternative preferred embodiment is illustrated in FIG. 4, comprising a four port add/drop optical multiplexing device for removing a single channel from a multi-channel multi-wavelength division multiplexed signal of a fiber-optic telecommunication system trunk line, and re-injecting the same channel with a different payload or information. Specifically, the add/drop optical multiplexing device 70 of FIG. 4 is seen to comprise a common port 72 receiving the multi-channel signal from collimator 74 which is optically coupled to trunk line 76 of the fiber-optic telecommunication system. Trunk line 76 typically comprises a fiber-optic line or other waveguide, most preferably a fiber-optic line comprising single mode fiber ("SW"). It is a significant feature in the embodiment of FIG. 4 that the collimator 74 is aligned to pass the expanded beam along a light path 78 extending from the common port to the first channel port 80 at a first location of optical filter element 82. Wavelengths which are not in-band of filter element 82 are reflected along light path 78 to second channel port 84 at a first location of second filter element 86. Significantly, the light path 78 extends from second channel port 84 back to a second location 88 of first filter element 82, and from there to a second location 90 of second filter element 86. Only then does light path 78 pass through unfiltered residual port 92 to be received by collimator 94 which is optically coupled to downstream portion 96 of trunk line 76.

As described above regarding the embodiment of FIG. 3A, a branch line 98 carries the drop channel passed by channel port 80 which is seen to comprise also a post filter 100. Branch feed line 102 carries a new signal at the same wavelength sub-range as the drop channel. Such new signal is re-injected at channel port 90 so as to be multiplexed with the remainder of the multi-channel signal not extracted at first channel port 80. As in the embodiment of FIG. 3A, filter elements 82, 86 and 100 preferably have substantially identical optical transmittance and reflectance properties. Significantly, however, the angle of the light is sufficiently lower in the embodiment of FIG. 4, such that the expanded beam has four bounce-points at the filter elements. Such low angle is established by the alignment of the collimators and the dimensions of the optical block. It will be recognized from the discussion above, that a significant advantage of the present invention is achieved by the additional reflective bounces at the filter elements. Specifically, improved signal isolation is provided by such additional reflection points along the light path through the optical block. More specifically, the additional bounces provide an increased effective FOM for the dropping filter. Thus, while the filters should be low reflectance, as discussed above, using even −7.5 dB filters in the embodiment of FIG. 4 provides a −30 dB device, (meaning a device having a −30 dB notch depth, that is, a device with −30 dB signal isolation), since it is a four-bounce device. Using −10 dB filters would, correspondingly, provide a −40 dB device. In this regard, it is a significant advantage of preferred embodiments described above, employing an optical block forming a gas-filled optical slot between parallel opposite surfaces, that the increased effective FOM of the invention can be achieved in an add/drop multiplexing device of small size Residual signal of the dropped channel is reduced by the several bounces of the multi-bounce zig-zag expanded beam light path defined within the optical slot.

It will be apparent to those skilled in the art given the present disclosure, that filter element 82 can comprise separate filter members at the first and second locations and, correspondingly, filter element 86 can comprise separate filter members at its first and second locations. More preferably, however, the first and second locations of the first filter element are spaced locations on a first unitary filter member mounted to the optical block. Similarly, the first and second locations of the second filter element preferably are spaced locations on a unitary filter member mounted to the opposite surface of the optical block. Such unitary filter elements are advantageous in that they reduce the cost and complexity of assembling the device. More specifically, selection and alignment on the optical block of two filter members, one on each side, is easier than selecting and aligning on the optical block four filter members, two on each side. Selection of the filter elements includes "kitting" of the filter members. Kitting the filter members includes choosing for a given device a set of filter members, each of which varies by approximately the same amount from the specified center wavelength for the channel to be added/dropped. Means for tuning the device so as to compensate for such off-centeredness are far more easily applied to the device as a whole, rather than to individual filter members. In applying the compensation to the device as a whole, however, each of the filter members will be adjusted in the same direction and in approximately the same amount. Thus, kitting is required so that a uniform correction can be usefully applied to all of the filter members.

As for the embodiment of FIG. 3A, the add/drop optical filter element of FIG. 4 preferably employs narrowband cavity filters having ultra-square in-band wavelength sub-ranges. Suitable filters are commercially available. The filters preferably are dielectric, multi-cavity, most preferably three cavity, film stack coatings of the type commonly known in the optics industry as Fabry-Perot cavity filters, often referred to simply as cavity filters. Two dielectric thin film stacks which by themselves form a reflector for the optical wavelengths in question, are separated by a thicker cavity layer. This structure is then repeated one or more times to produce a filter with enhanced blocking and improved in-band transmission flatness. The net effect is to produce a narrowband transmissive filter where in-band light is transmitted and out-of-band light is reflected. Dichroic filters may also be used. This improved filter performance provides commercially acceptable dense channel wavelength division multiplexing for fiber-optic telecommunications applications of the optical multiplexing device. Multi-cavity interference filters can be produced with dense, stable metal oxide film stacks using the deposition techniques mentioned above. Such filters in preferred embodiments have excellent thermal stability at 1550 nm and ultra-narrow bandwidths, separated by as little as 2 nm, or even as little as 1 nm. Stable ultra-narrowband filters are shown in SPIE Proceedings 7/1994, the disclosure of which is hereby incorporated by reference. High-quality interference filters comprising stacked layers of metal oxide materials, such as e.g., niobia and silica, can be produced on suitable optical substrate, such as optical glass, fused silica, etc., e.g., the BK series (such as BK1, BK3 and BK7), SSK1, WG320 and RG1000 available from Schott Glaswerke (Mainz, Germany) and any suitable Pyrex(r) optical glass from Corning, Inc. (Corning, N.Y., U.S.A.). The filters can be formed by commercially known plasma deposition techniques, such as ion assisted electron beam evaporation, ion beam sputtering, and reactive magnetron sputtering, for example, as disclosed in U.S. Pat. No. 4,851,095 to Scobey et al., and U.S. Pat. No. 5,525,199 to Scobey the entire disclosure of both these patents being hereby incorporated by reference. Such coating methods can produce interference cavity filters formed of stacked dielectric optical coatings which are advantageously dense and stable, with low film scatter and low absorption, as well as low sensitivity to temperature changes and ambient humidity. Suitable filters are disclosed also in U.S. Pat. No. 4,957,371 to Pellicori et al. Suitable alternative filter elements and the like will be apparent to those skilled in the art in view of this disclosure.

Figure 5A:
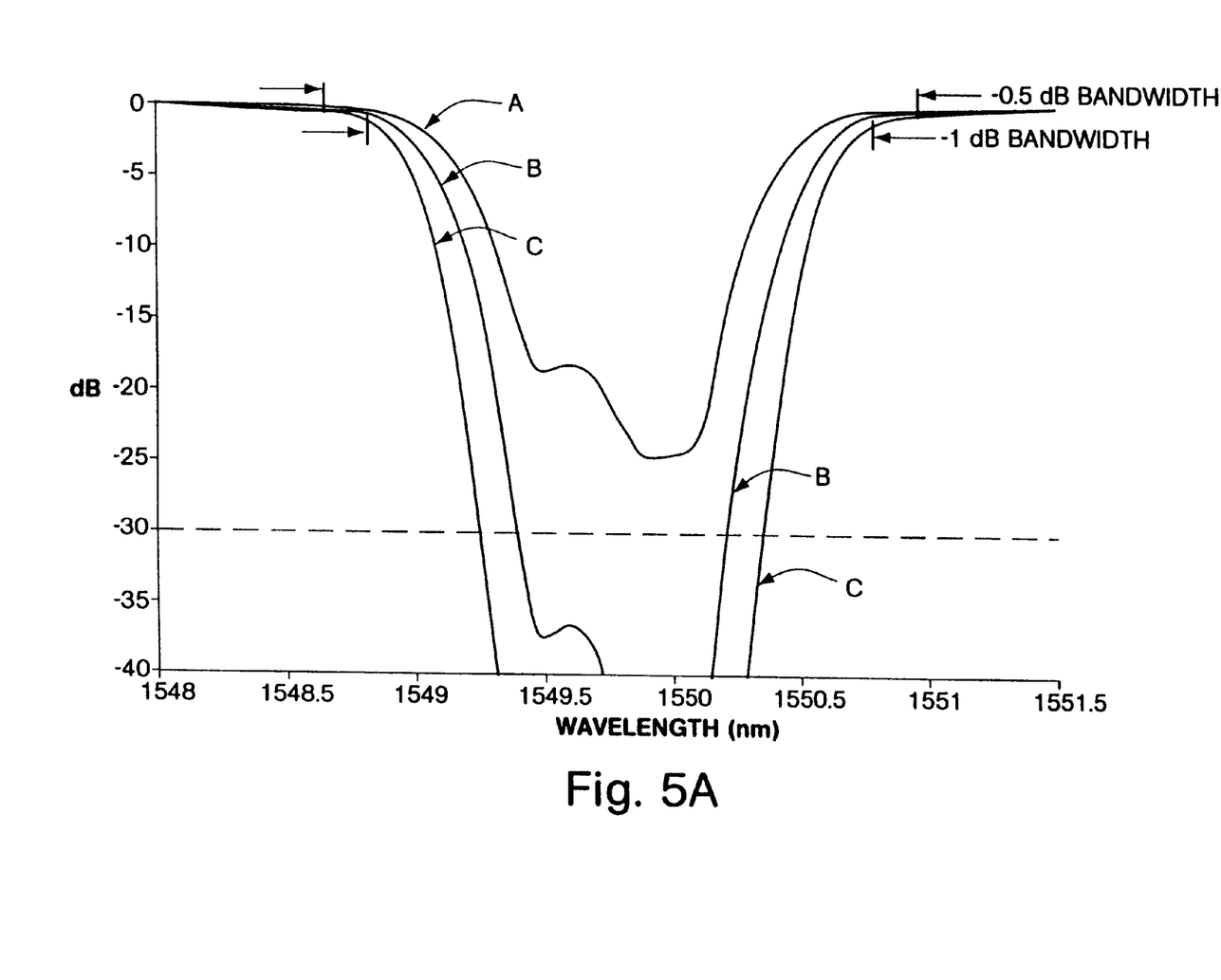
FIG. 5A shows optimized (calculated) reflectance curves for one, two and three bounce add/drop telecommunication multiplexing devices.
Figure 5B:
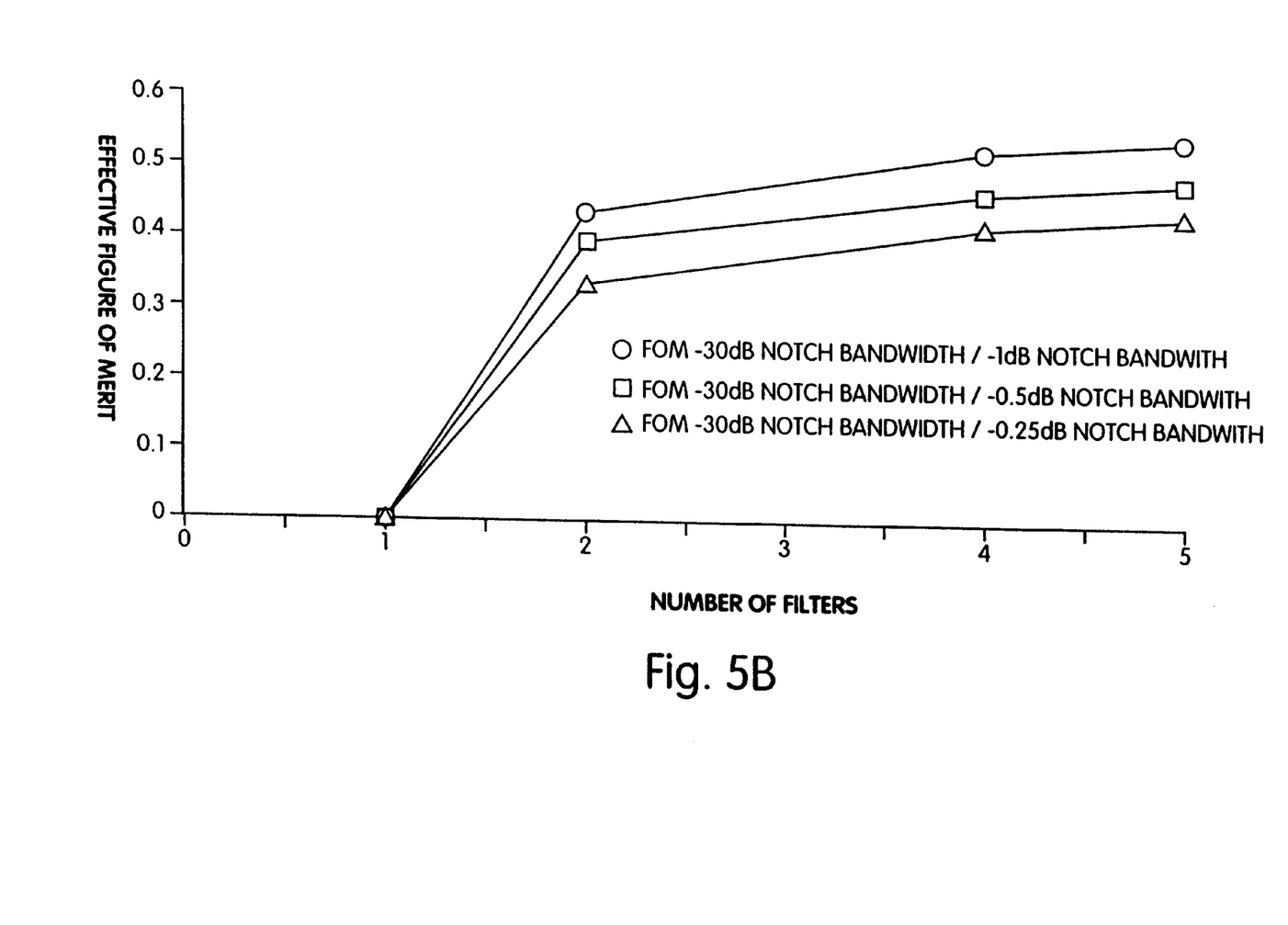
FIG. 5B is a graph representing the improvement achieved in the effective figure-of-merit (FOM) of a narrowband cavity filter employed in an add/drop optical multiplexing device.

The advantageous effect of multiple reflective bounces in accordance with the embodiment of FIG. 4 is illustrated in the graphs shown in FIGS. 5A and 5B. FIG. 5A shows the reflectance spectral response of multiple bounces off a typical band pass interference filter suitable for a port of an add/drop multiplexing device for a telecommunication system. Curve A corresponds to reflectance for one "bounce" of an optical signal at such band pass filter. It can be seen that the filter function for in-band signal does not reach −30 dB. Thus, FOM 30/1 or FOM 30/0.5 values cannot be stated. Curve B corresponds to two bounces of the optical signal at such filter element. A dashed horizontal line indicates −30 dB. Curve C shows the further improved results for a three bounce system or arrangement. It can be seen that the −30 dB width is greater for the three bounce curve C than for the two bounce curve B. The −0.5 dB and −1.0 dB curve widths also are indicated. Such graphical results are indicative of the improved, i.e., higher, effective FOM achieved by the add/drop multiplexing devices disclosed here, employing multiple filter bounces before a multiplex signal is returned to a trunk line or the like. FIG. 5B further illustrates the improved effective FOM achieved with multiple bounces. As seen there, the effective FOM measured as FOM 30/1 FOM 30/0.5 and FOM 30/0.025 all increase monotonically as the number of bounces increases.

Figure 6:
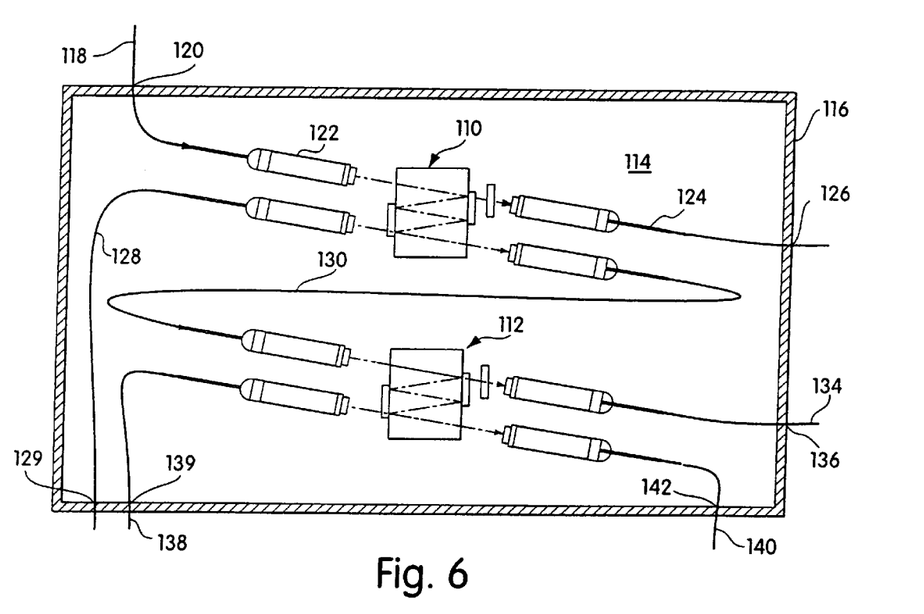
FIG. 6 illustrates optical multiplexing device in a fiber-optic telecommunication system in accordance with the present invention, employing multiple add/drop optical multiplexing devices in accordance with the embodiment of FIG. 4.

An optical multiplexing device is illustrated in FIG. 6 comprising multiple add/drop optical multiplexing devices, each substantially in accordance with the embodiment of FIG. 4. Specifically, each of the two add/drop devices 110, 112 is seen to be mounted within an enclosed space 114 defined by housing 116. Optionally, housing 116 hermetically seals enclosed space 114. Trunk line 118 of a fiber-optic telecommunication system carrying a multi-channel wavelength division multiplexed signal, passes through access port 20 to a collimator 122 associated with the common port of first add/drop device 110. A first channel is extracted by add/drop device 110 to branch line 124 which passes out of housing 116 at access port 126. A replacement signal carried by feed line 128 entering housing 116 at access port 129, at the same wavelength sub-range as the extracted signal, is injected at the second channel port of add/drop device 110. The multiplexed signal comprising the substitute or replacement signal from feed line 128 is carried by fiber-optic line 30 or other waveguide to the common port of add/drop device 112. A second individual channel is extracted by add/drop device 112 to branch line 134 which passes out of housing 116 at access port 136. A replacement signal from feed line 138 passing into housing 116 at access port 139, injects a substitute signal at the second channel port of add/drop device 112. The multiplexed signal, comprising a substitute signal on two channels, is carried by downstream portion 140 of trunk line 118. Line 140 passes through housing 116 at access port 142. It will be apparent to those skilled in the art that additional add/drop devices may be employed in sequence, optionally within a housing in accordance with the embodiment of FIG. 6, to extract any number of signals from a multi-channel multiplexed signal, and to inject substitute signals for each of the extracted channels.

The various preferred embodiments disclosed and described above are intended to be exemplary, rather than limiting. Those skilled in the art, given the benefit of this disclosure and of the detailed description of the various preferred embodiments above, will recognize that numerous additions and other modifications can be made to those preferred embodiments without departing from the true scope and spirit of the present invention. The following claims are intended to cover the true scope and spirit of the invention.

We claim:

1. An optical multiplexing device comprising a filter assembly defining a light path from a common port to at least a first channel port, a second channel port and a pass-through port, in that order, the common port and pass-through port each being substantially transparent to at least a wavelength range, the first channel port comprising a first optical filter element being substantially transparent to a wavelength sub-range within the wavelength range of the common port and substantially reflective of other wavelengths within the wavelength range, and the second channel port comprising a second optical filter element having light transmittance and reflectance properties substantially identical to those of the first optical filter element such that a channel signal having the wavelength sub-range can be transmitted out of the light path at the first channel port, and a new channel signal having substantially the same wavelength sub-range can be transmitted in to the light path at the second channel port.

2. An optical multiplexing device comprising an optical block defining a multi-bounce zigzag expanded beam light path from a common port, at least a first channel port to a second channel port and a pass-through port, in that order, the common port and pass-through port each being substantially transparent to at least a wavelength range, the first channel port comprising a first optical filter element being substantially transparent to a wavelength sub-range within the wavelength range of the common port and substantially reflective of other wavelengths within the wavelength range, and the second channel port comprising a second optical filter element having light transmittance and reflectance properties substantially identical to those of the first optical filter element such that a channel signal having the wavelength sub-range can be transmitted out of the light path at the first channel port, and a new channel signal having substantially the same wavelength sub-range can be transmitted in to the light path at the second channel port.

3. The optical multiplexing device of claim 2 wherein each of the multi-cavity interference filters has reflectance of the wavelength sub-range of −7.5 dB to −15 dB.

4. The optical multiplexing device of claim 3 wherein the optical block provides at least −30 dB total isolation for the wavelength sub-range.

5. The optical multiplexing device of claim 2 wherein the optical block is substantially rectilinear and forms a gas-filled optical slot between a first surface of the optical block and an opposite surface which is spaced from and substantially parallel to the first surface, the common port being at the first surface and at least one of the channel ports being at the opposite surface.

6. The optical multiplexing device of claim 5 wherein the common port comprises a first collimator aligned to pass an expanded beam into the optical block through the common port toward the first channel port, the first channel port further comprises a second collimator aligned to receive an expanded beam passed by the first filter element, and the second channel port further comprises a third collimator aligned to pass an expanded beam to the second channel port.

7. The optical multiplexing device of claim 6 wherein the pass-through port comprises a fourth collimator aligned to receive an expanded beam passed by the residual port.

8. The optical multiplexing device of claim 6 wherein the first channel port further comprises a post filter positioned between the first filter element and the second collimator, the post filter having transmittance properties substantially identical to those of the first filter element.

9. The optical multiplexing device of claim 2 wherein the optical block has a first surface and an opposite surface which is spaced from and substantially parallel to the first surface, the common port being at the first surface, the first channel port being at the opposite surface, the second channel port being at the first surface, and the pass-through port being at the second surface, a first collimator being aligned to pass an expanded beam through the common port to at least a first location of the first optical filter element, a first location of the second optical filter element, a second location of the first optical filter element and a second location of the second optical filter element, in that order, before the pass-through port the second locations having light transmittance and reflectance properties substantially identical to those of the first locations.

10. The optical multiplexing device of claim 9 wherein the first and second locations of the first optical filter element are spaced locations on a first unitary filter member mounted to the second surface of the optical block.

11. The optical multiplexing device of claim 9 wherein the first and second locations of the second optical filter element are spaced locations on a second unitary filter member mounted to the first surface of the optical block.

12. The optical multiplexing device of claim 2 further comprising a housing forming an enclosed space, with passages for multiple optical waveguides from within the enclosed space to outside the housing, the optical block being mounted within the enclosed space.

13. The optical multiplexing device of claim 12 wherein the housing hermetically seals the enclosed space.

14. A fiber-optic telecommunication system comprising, in combination:
an optical multiplexing device comprising a filter assembly defining a light path from a common port to at least a first channel port, a second channel port and a pass-through port, in that order, the common port and pass-through port each being substantially transparent to at least a wavelength range, the first channel port comprising a first optical filter element being substantially transparent to a wavelength sub-range within the wavelength range of the common port and substantially reflective of other wavelengths within the wavelength range, and the second channel port comprising a second optical filter element having light transmittance and reflectance properties substantially identical to those of the first optical filter element;
a trunk line waveguide carrying multiple channel signals, optically coupled to the common port;
a receiver line waveguide optically coupled to the first channel port;
an add line waveguide optically coupled to the second channel port; and
a pass-through trunk line waveguide optically coupled to the pass-through port.

15. The fiber-optic telecommunication system of claim 14 wherein the trunk line waveguide, receiver line waveguide, add line waveguide and pass-through trunk line waveguide each is a fiber-optic line, and the common port, first channel port second channel port and pass-through port each comprises a collimator aligned with the respective port for focusing light passed therethrough.

16. A fiber-optic telecommunication system employing wavelength division multiplexing and comprising, in combination:
a fiber-optic trunk line carrying multiple channel signals; and
an optical multiplexing device comprising an optical block defining a multi-bounce zigzag expanded beam light path from a common port to a first channel port and then to a second channel port and then to at least a pass-through port, the common port and pass-through port each being substantially transparent to multiple channel signals carried by the trunk line;
the first channel port comprising a first optical filter element substantially transparent to at least one channel signal passed by the common port and substantially reflective of multiple channel signals other than the at least one channel signal passed by the common port; and
the second channel port comprising a second optical filter element having light transmittance properties substantially identical to those of the first optical filter element such that the at least one channel signal can be removed from the multiple channel signals at the first channel port, and a new channel signal at substantially the same wavelength of the at least one channel signal can be added to the multiple channel signals at the second channel port.

17. The fiber-optic telecommunication system of claim 16 wherein the first channel port and the second channel port are substantially transparent to a single channel signal.

18. The fiber-optic telecommunication system of claim 16 wherein each of a plurality of the optical multiplexing devices occurs in sequence along the trunk line and multiplexes a different channel signal.

19. The fiber-optic telecommunication system of claim 16 further comprising a housing defining an enclosed space, at least two of said optical multiplexing devices being mounted within the enclosed space.

20. A method of multiplexing optical signals, comprising:

passing an optical multi-channel signal from a waveguide to a common port of an optical multiplexing device comprising a filter assembly defining a light path from the common port to at least a first channel port, a second channel port and a pass-through port, in that order, the common port and pass-through port each being substantially transparent to at least a wavelength range, the first channel port comprising a first optical filter element being substantially transparent to a wavelength sub-range within the wavelength range of the common port and substantially reflective of other wavelengths within the wavelength range, and the second channel port comprising a second optical filter element having light transmittance and reflectance properties substantially identical to those of the first optical filter element;

a channel signal having said wavelength sub-range is removed from the multi-channel signal at the first channel port; and a new channel signal having substantially the same wavelength sub-range is added to the multi-channel signal at the second channel port.

21. A method of multiplexing optical signals comprising:

passing an optical multi-channel signal from a waveguide to a common port of a filter assembly defining a multi-bounce light path from the common port to a first optical filter element of a first channel port, and then to a second optical filter element of a second channel port, and then to a second location of the first optical filter element, and then to a second location of the second optical filter element and then out of the filter assembly at a pass-through port into a waveguide; wherein a channel signal having a selected wavelength sub-range is removed from the multi-channel signal at the first channel port; and a new channel signal having substantially the same wavelength sub-range is added to the multi-channel signal at the second channel port.

22. A method of multiplexing optical signals comprising:

passing an optical multi-channel signal from a waveguide as an expanded beam through a collimator to a common port of an optical block having a first surface and an opposite surface which is spaced from and substantially parallel to the first surface, the optical block defining a multi-bounce zigzag expanded beam light path from the common port at the first surface to a first location of a first optical filter element of a first channel port at the opposite surface, and then to a first location of a second optical filter element of a second channel port at the first surface, and then to a second location of the first optical filter element and to a second location of the second optical filter element and then out of the optical block at a pass-through port into a waveguide; wherein a channel signal having a selected wavelength sub-range is removed from the multi-channel signal at the first channel port; and a new channel signal having substantially the same wavelength sub-range is added to the multi-channel signal at the second channel port.

\* \* \* \* \*